United States Patent [19]
Hong

[11] Patent Number: 5,665,240
[45] Date of Patent: Sep. 9, 1997

[54] POINT-OF-USE REMOVAL OF LEAD IN DRINKING WATER USING PHOSPHATE AND CARBONATE MINERALS

[75] Inventor: Puikwan Andy Hong, Salt Lake City, Utah

[73] Assignee: University of Utah, Salt Lake City, Utah

[21] Appl. No.: 410,216

[22] Filed: Mar. 24, 1995

[51] Int. Cl.$^6$ ................................. B01J 39/00
[52] U.S. Cl. .................. 210/665; 210/683; 210/685; 210/688; 210/726; 210/201; 210/202; 210/906; 210/912
[58] Field of Search ............................ 210/665, 683, 210/685, 688, 726, 906, 912, 201, 202

[56] References Cited

U.S. PATENT DOCUMENTS

| | | | |
|---|---|---|---|
| 4,096,064 | 6/1978 | du Fresne | 210/120 |
| 4,671,882 | 6/1987 | Douglas et al. | 210/720 |
| 4,737,356 | 4/1988 | O'Hare et al. | 423/659 |
| 4,789,475 | 12/1988 | Harte et al. | 210/502.1 |
| 4,902,427 | 2/1990 | Szczepanik | 210/484 |
| 4,994,191 | 2/1991 | Kuznicki et al. | 210/688 |
| 5,053,139 | 10/1991 | Dodwell et al. | 210/688 |
| 5,076,941 | 12/1991 | Boffardi et al. | 210/753 |
| 5,082,568 | 1/1992 | Holler | 210/679 |
| 5,098,579 | 3/1992 | Leigh et al. | 210/724 |
| 5,133,871 | 7/1992 | Levy | 210/688 |

*Primary Examiner*—Robert Popovics
*Attorney, Agent, or Firm*—James L. Sonntag

[57] ABSTRACT

A process for removing lead from drinking water discharged from a drinking water outlet comprising:

(a) directing the water through a first matrix comprising a calcium mineral of between 10 and 100 weight percent of a solid calcium phosphate mineral which is slightly soluble in water, the remaining portion being a solid calcium carbonate mineral which is slightly soluble in water, such that there is sufficient contacting between the water and the first matrix to introduce sufficient phosphate ions into the water to form lead precipitate and reduce the lead concentration in the water to below 15 parts per billion, (b) directing the lead depleted water from step (a) through a second matrix, the second matrix comprising a mineral that when in equilibrium with the water reduces the phosphate ion concentration to 60 mg/L or below.

8 Claims, 1 Drawing Sheet

POINT-OF-USE REMOVAL OF LEAD IN DRINKING WATER USING PHOSPHATE AND CARBONATE MINERALS

FIELD OF THE INVENTION

This invention relates to the removal of lead from drinking water.

BACKGROUND OF THE INVENTION

State of the Art

The elevated concentration of lead in drinking water has become a major public health concern. A recent sampling by the U.S. Environment Protection Agency (EPA) of 660 large public water systems found that about 32 million Americans in 130 cities drink water from systems that exceed the federal action limit of 15 parts per billion and that 10 cities exceed the limit by as much as 5 times. The natural waters in many small towns and rural areas in the United States, especially in the southwest, often contain a high concentration of lead and copper.

The long-term intake of excessive lead in water, along with exposure from lead-based paint and contaminated soil and dust, can build up in blood to result in a concentration of this toxic metal to a harmful level. Lead is known to severely hamper physical and mental development in children, to raise blood pressure and interfere with hearing and, at a very high level, to cause kidney damage and mental retardation in adults. In reaction to these findings, the EPA's rule concerning lead in drinking water has become much more stringent, requiring some 79,000 public water supply systems to monitor lead levels at the tap and setting an action level of 15 ppb. The lead may be present in the water as solid particles or be in the water as a soluble complex.

There are various methods to separate lead from the aqueous solution. The separation processes employed usually involve (1) ion exchange, (2) adsorption, (3) reverse osmosis, and (4) coagulation and precipitation.

Ion exchange is a process by which a given ion on an exchange solid is replaced by another ion in the solution, and is often used in processes for control of soluble metals, such as lead. For example, it is known that an ion exchange resin in calcium form can reduce lead in household drinking water, but the resin often lacks the ability to remove lead to the very low level required. Solid minerals can also be used as an ion exchange medium. For example, Takeuchi et al. ("A Study Equilibrium and Mass Transfer . . . ," Journal of Chemical Engineering of JAPAN, 21:1 pp. 98–100, 1988) discloses batch adsorption experiments using solid hydroxyapatite ($Ca_5(PO_4)_3OH$). Heavy metals, including lead, were removed from distilled water spiked with the metals by an equilibrium mass transfer of metals between the solid and aqueous phase. The removal of heavy metals was attributed to the ion exchange process in which the surface calcium was replaced by a divalent metal, e.g. $Pb^{2+}$.

Adsorption processes usually exploit the Weak van der Waals forces which are responsible for many reversible adsorption of solutes to solid surface, or may involve more specific processes such as ion exchange and/or surface complexation. The weak physical adsorption can be easily reversed upon changes in conditions such as concentration of the solute, pH, temperature, or saturation of surface sites. Prior-art adsorption processes include using a granular activated carbon fixed-bed in a canister as a point-of-use device to remove lead from drinking water. Lead from a solution has also been adsorbed upon the surface of Vermiculite (a mica), Montmorillonite (a bentonite clay) and Goethite (an iron oxide).

Reverse osmosis has been used in point-of-use devices for removing lead from drinking water, as disclosed in Consumer Reports ("Water Treatment Devices," February 1993, pp. 79–82). Also disclosed are devices using distillation, and filtration.

Precipitation, where selected chemicals are applied to cause the solubility of solids to be exceeded, has been used to separate lead from the aqueous phase. Most particularly, carbonate or hydroxide precipitation has been proposed to remove heavy metals from solution. For example, calcium carbonate added to lead solutions has been used to remove lead as a precipitate. It has also been proposed to remove lead by coagulation and flocculation with alum at pH 8 to 9.

In U.S. Pat. No. 5,098,579 to Leigh et al. a method is proposed for continuously treating water by contacting the water with a metal salt which is sparingly soluble in water and has a very strong affinity to react with the ions to be removed to form an insoluble salt. The choice of the sparingly soluble salt is based upon the properties of the ion to be removed. For removal of $Pb^{2+}$ ions the sparingly soluble salt may be any of various carbonate and chromate salts, $Ca_3(PO_4)_2$, $CaSO_4$, or mixtures thereof.

The precipitation processes, such as Leigh et al., are directed mainly to industrial waste streams, and the like. Typically, prior-art precipitation treatments of water were not designed to remove lead to an extremely low value, such as to 15 ppb, and were not designed to function in a point-of-use home culinary system. An ideal point-of-use device for removing lead from drinking water should be capable or removing lead to a concentration of 15 ppb or lower. In addition, it should be relatively inexpensive, mechanically simple and not involve much maintenance. A device that is awkward to apply to existing drinking water systems in the household, has a short service life or requires frequent recharging, involves handling of chemicals, particularly hazardous solids and liquids, or is expensive to purchase or maintain is not suitable. Such a device is will likely not be used at all and will be eventually discarded or misused by the consumer. In addition, a point-of-use system should provide some indication when its lead removing ability is exhausted. For example, in systems using adsorbents, the like, there is usually no indication when the adsorbent is approaching saturation and becoming ineffective in removing lead sufficiently from the drinking water.

For use in culinary water, it is necessary to use a system that not only removes the toxic lead ions, but also does not introduce substances that are themselves toxic or will give the water a bad taste. For example, it has been found that $Ca_3(PO_4)_2$ can be used to reduce lead to below the EPA action level, but it leaves a concentration of phosphate ions that gives the water a strong taste. The phosphate ion concentration can be eliminated or reduced by using carbonate salts or by mixing phosphate salts with carbonate salts. However, it has been found that this increases the solubility of the lead ions to a concentration above the EPA action level. Thus, practice of a prior-art precipitation system, such as the Leigh et al. system, for removing lead ions either will not remove lead to sufficiently low levels, or it will produce water with safe lead levels but is bad tasting.

OBJECTS OF THE INVENTION

It is an object of the invention to provide a point-of-use system for the removal of lead from drinking water to safe concentration.

It is another object of the invention to provide a system for removing lead from drinking water that reduces the concentrations of strong-tasting ions which are introduced by the treatment into the water, such as phosphates.

It is another object of the invention to provide a device for treatment of water that is relatively inexpensive, easy to install, and easy to maintain.

Further objects of the invention will become evident in the description below.

SUMMARY OF THE INVENTION

An embodiment of the invention is a process for removing lead from drinking water discharged from a drinking water outlet comprising:

(a) directing the water through a first matrix comprising a calcium mineral of between 10 and 100 weight percent of a solid calcium phosphate mineral which is slightly soluble in water, the remaining portion being a solid calcium carbonate mineral which is slightly soluble in water, such that there is sufficient contacting between the water and the first matrix to introduce sufficient phosphate ions into the water to form lead precipitate and reduce the lead concentration in the water to below 15 parts per billion, (b) directing the lead depleted water from step (a) through a second matrix, the second matrix comprising a mineral that when in equilibrium with the water reduces the phosphate ion concentration to 60 mg/L or below.

An embodiment of the invention is an apparatus of the point-of-use removal of lead from drinking water comprising;

(a) a first matrix comprising a calcium mineral of between 10 and 100 weight percent of a solid calcium phosphate mineral which is slightly soluble in water, the remaining portion being a solid calcium carbonate mineral which is slightly soluble in water, (c) a second matrix, the second matrix comprising a second matrix mineral that in equilibrium with water provides a phosphate ion concentration of less than 60 mg/L, and (c) means for directing water from a culinary water source through the first matrix, then subsequently through the second matrix, and then to an outlet, such that the water flow first through the first matrix and the second matrix with sufficient contacting between the water and the first matrix to introduce sufficient phosphate ions into the water to form lead precipitate and reduce the lead concentration in the water to below 15 parts per billion, and sufficient contact with the second matrix such that the phosphate ion concentration is reduced to 60 mg/L or below.

In the first matrix, sufficient phosphate ions are dissolved in the water to precipitate lead salts from the solution and reduce the lead concentration to below 15 parts per billion. Preferably, the first matrix comprises a mixture of slightly soluble calcium carbonate and calcium phosphate minerals, although a matrix solely of a calcium phosphate mineral is contemplated by the invention. By using a mixture of the phosphate and carbonate minerals the concentration of phosphate ions in the water leaving the matrix is not as high as with a matrix solely of phosphate mineral. However, enough phosphate ion is introduced into the solution to sufficiently remove lead through precipitation of lead salts. The precipitated lead salts are then by filtration action of the first matrix are retained in the first matrix.

The preferred composition of the first matrix is between 10 and 50 weight percent of the calcium phosphate mineral, the remaining portion being the calcium carbonate mineral. These preferred mixed composition suppress the phosphate ion concentration, while still providing sufficient phosphate concentration for formation of insoluble lead salts. It is accordingly easier to bring the phosphate ion concentration to a desired concentration below 60 mg/L by treatment with the second matrix mineral.

The calcium mineral of first matrix contains a slightly soluble calcium phosphate mineral and preferably a slightly soluble calcium carbonate mineral. The minerals may be mixtures and contain other cation species, such as magnesium.

The phosphate and carbonate minerals are described as being calcium minerals, but other suitable minerals that provide the same solubility of the carbonate and the phosphate ion would be suitable. For example, it is believed that magnesium analogous to the calcium salt described would be suitable. The requirement is that when a slightly soluble phosphate and carbonate minerals are used in the first and second matrix that the cation is common to both minerals. For example the first matrix may contain a slightly soluble magnesium phosphate mineral and preferably a slightly soluble magnesium carbonate mineral.

The phosphate minerals are those that when dissolved in water form phosphate ions, and the carbonate minerals are those that when dissolved in water form carbonate ions. By a mineral that is "slightly soluble in water" is meant a carbonate or phosphate salt that provides an equilibrium concentration of carbonate ions and phosphate ions of less than about 200 ppm and 100 ppm, respectively. By "carbonate ions" is meant carbonate ions, as well as soluble conjugate forms, such as bicarbonate ions and carbonic acid ($CO_3^{2-}$, $HCO_3^-$, and $H_2CO_3$). Likewise, by "phosphate ions" is meant dissolved $PO_4^{3-}$ and its conjugate forms, such as $HPO_4^{2-}$, $H_2PO_4^-$, and $H_3PO_4$.

Suitable phosphate minerals include, but are not limited to, calcium phosphate ($Ca_3(PO_4)_2$), calcium biphosphate ($CaHPO_4$), and hydrated forms, such as brushite ($CaHPO_4 \cdot 2H_2O(s)$), hydroxyapatite ($Ca_5(PO_4)_3OH(s)$), Newberyite ($MgHPO_4 \cdot 3H2O(s)$), and Bobierrite $Mg_3(PO_4)_2 \cdot 8H_2O(s)$), or mixtures of the above. The phosphate mineral may also contain other minerals, for example, magnesium phosphate ($Mg_3(PO_4)_2$), or magnesium biphosphate ($Mg_3(PO_4)_2$).

For mixtures in the first matrix that include slightly soluble carbonate minerals, any phosphate and carbonate mineral pair of calcium that is slightly soluble is suitable. The optional carbonate mineral in the first matrix functions to reduce the release of phosphate ions, but may also function to remove lead by formation of lead carbonate salts. Suitable carbonate minerals include, but are not limited to, calcium carbonate ($CaCO_3$), and calcium magnesium carbonate ($CaMg(CO_3)_2(s)$), and mixtures thereof, and may include, for example magnesium carbonate ($MgCO_3$). In any case, any mineral in the first matrix should not introduce other ions or substances that are toxic or may create a bad taste.

The lead in the water being treated by the present process is typically in the form of suspended particles of lead and lead compounds, free lead ions, and dissolved hydrolyzed complexes, e.g., $Pb^{2+}$, $Pb(OH)^+$, $Pb(OH)_2^0$, $Pb(OH)_3^-$, or in the form of complexes of carbonate or other ligands, e.g., $PbCO_3^0$, $Pb(CO_3)_2^{2-}$; $PbCl^+$, $PbCl_2^0$, $PbCl_3^-$, or $PbSO_4^0$.

The second matrix has the principal function, of removing phosphate ions from the water leaving the first matrix, although it can also function to further remove remaining lead ions by precipitation of insoluble lead salts and to mechanically filter and retain insoluble salts in the matrix. The second matrix reduces the phosphate ion concentration to about 60 mg/L or below. At these concentrations, the phosphate will generally not introduce an unacceptable taste to water.

In one embodiment, the second matrix comprises a solid carbonate mineral that is slightly soluble in water so as to introduce sufficient carbonate ion into solution to reduce the phosphate ion concentration to about 60 mg/L or below. The mineral is preferably a calcium mineral, but mineral or other cations are suitable if the required solubility of the carbonate ion is achieved, and it should have the same cation as the mineral or minerals in the first matrix. The carbonate mineral may be any of the carbonate minerals used in the first matrix. In simplified terms, the carbonate mineral in the absence of a soluble or slightly soluble phosphate mineral by the common calcium ion creates an equilibrium that favors dissolved carbonate ions at the expense of phosphate ions. Accordingly, the phosphate ions are precipitates as solid salts, which are retained in the second matrix.

In another embodiment of the invention, the second matrix comprises an essentially insoluble phosphate mineral. An insoluble phosphate mineral for use in the second matrix is defined herein as a mineral that is less soluble than the phosphate mineral used in the first matrix and a mineral that when in equilibrium with an aqueous solution, the concentration of the phosphate ion in the solution is less than 60 mg/L. A preferred insoluble phosphate mineral is hydroxyapatite. In this embodiment, the lead ions are removed mainly in the first matrix by a more soluble phosphate mineral, then residual phosphate ions are removed in the second matrix using a much less soluble phosphate mineral.

The first and second mineral matrices may be contained in separate containers or canisters connected in series or a common containment that provides the suitable means for directing the flow or water. A suitable apparatus comprises a first cartridge through which water is directed, followed through series connection to a second flow-through cartridge. The matrices may also be contained in a single cartridge. If contained in a single canister, the mineral matrices must be separated by suitable mechanical means, or the matrices themselves must have sufficient mechanical stability to prevent substantial migration of the minerals from one matrix to the other. The canisters must by configured to first provide flow of the water through the first matrix and then through the second matrix. When in a single or separate canisters, the matrices may be in the form of packed beds or porous shapes placed in series. In a single containment the packed beds may be separated by a suitable porous separator. The matrices may any suitable shape, for example, cubical, cylindrical, or tubular. Tubular matrices may, for example, be configured as an inner first matrix surrounded by an outer second matrix. Water is directed into the tubular cavity of the first matrix, then flowing radially through the first matrix and the second matrix to the outer circumference of the second matrix from where it is directed to an outlet. The tubular matrices may also be reversed such that the water would be introduced to the outer circumference, flow radially from the outer circumference of the first matrix inwardly sequentially through the first and second matrices and into the tubular cavity of the second matrix.

The present system is mainly contemplated as a point-of-use system that is applied to a tap or faucet outlet as the culinary water outlet. This may be accomplished by providing a system that can be attached to a the culinary water outlet. This can be in the form of a canister or canisters that attach to the faucet outlet by any suitable means. The apparatus of the invention may be constructed as a replacement to the screw-on filter screens usually found on faucets, by providing a threaded attachment at the inlet of the apparatus.

The amounts of the minerals in the first matrix is chosen to provide sufficient contact time to produce solution with sufficient phosphate concentration to remove lead ions by precipitation, taking into account, for example, the flow rate the particle size of the mineral and the configuration of the mineral bed. Also, the operating life of the mineral matrix should be considered, as the matrix is gradually consumed by use. The apparatus can be constructed to provide the user a visual indication that the system is depleted by having a means that shows when the matrix is dissolved. In the second matrix, the amount of mineral is chosen to provide sufficient contact time to provide the recited reduction in phosphate ion concentration.

Since the first and second matrices also act as filters to remove suspended particles and to retain the lead precipitates and the phosphate precipitates as they form, the matrix materials with suitable properties for filtering and water permeability are preferred. These properties include grain size and porosity. In addition, the physical dimensions of the matrices are such so as to provide a sufficiently thick filter bed for the sufficient contact with water and filtration of the solids and precipitates. The matrices may contain fillers or means for obtaining structural integrity of the matrix, as long as the lead removal function of the first matrix and the phosphate removal function of the second matrix is not significantly compromised.

The invention has also been found to remove to safe levels other undesirable dissolved metals in culinary water other than lead, in particular copper.

The present invention differs from prior-art processes in that it is possible by practice of the invention to reduce the lead content in the water to or below the EPA action level, but also reduce phosphate ion content to improve the taste of water. Because of the phosphate ions in the solution, the precipitate is more insoluble than lead carbonates alone, as in prior-art carbonate processes. However, by providing the first matrix of a carbonate/phosphate mixture of slightly soluble salts, followed by a second matrix to remove the phosphate ions, it is possible to reduce the phosphate concentration while simultaneously keeping the lead concentration low, providing good tasting water with safe lead concentrations.

The present invention also is improved over known ion exchange or adsorption processes, since each mineral matrix itself undergoes dissolution and the constituent phosphate and carbonate ions react with lead cations to form a highly insoluble lead phosphate/carbonate precipitate. The carbonate/phosphate minerals in the first and second matrices are consumable reactant rather than inert solids or a surface for adsorption of lead ions. Accordingly, the apparatus of the invention will function to remove lead from solution as long is there is phosphate mineral present, thus providing a clear indication that the apparatus is functioning.

DETAILED DESCRIPTION OF THE INVENTION

Theoretical Basis

Figure 1:
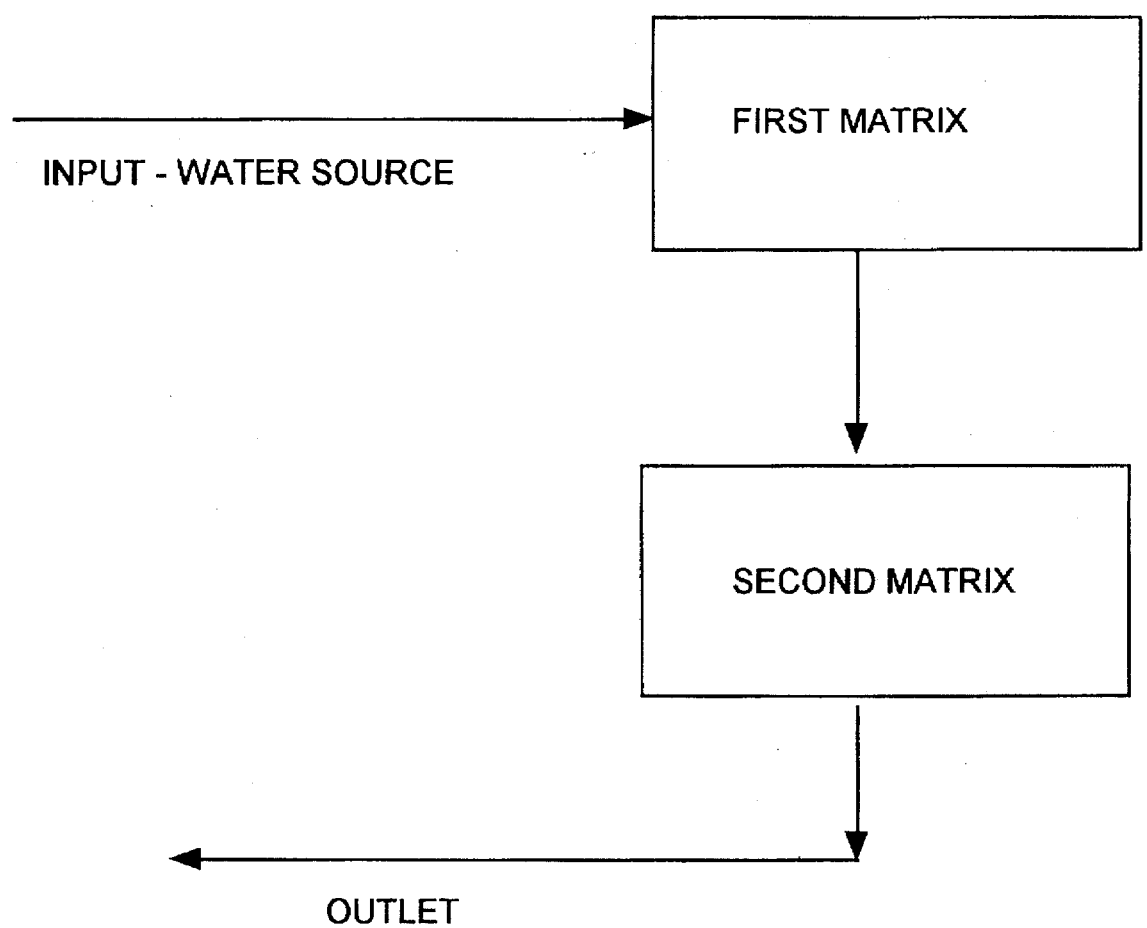
FIG. 1 is a flow diagram illustrating the invention.

It is known to use slightly soluble salts such as carbonate and phosphate to reduce lead ions in water by precipitation reactions. For example;

$$CO_3^{2-} + Pb^{2+} \rightarrow PbCO_3(s) \quad (1)$$

$$2PO_4^{3-} + 3Pb^{2+} \rightarrow Pb_3(PO_4)_2(s) \quad (2)$$

For purposes of this discussion process can be described by reference to the equilibrium constant equations;

$$K_C = [CO_3^{2-}][Pb^{2+}] = 10^{-13.1} \quad (3)$$

$$K_P = [PO_4^{3-}]^2[Pb^{2+}]^3 = 10^{-43.5} \quad (4)$$

The carbonate/lead ion constant ($K_C$) is small, but it is not sufficiently small such that carbonate ions from a slightly soluble mineral will by themselves reduce the lead levels to below the mandated limit of 15 ppb. The phosphate/lead ionization constant ($K_P$) is sufficiently small such that the phosphate ion concentration from a slightly soluble mineral will reduce the lead ion concentration to below the mandated limit. The slightly soluble phosphate mineral leaves an unsatisfactory, sharp tasting concentration of phosphate ions in the water. The actual equilibrium in water is more complex than this simple explanation, as it does not contemplate the role of complexed ions and the conjugate forms of carbonate and phosphate. But it does illustrate the dilemma of the apparent choice between treatment with a phosphate mineral for a safe lead concentration but with a high phosphate concentration, and treatment with a carbonate mineral for an acceptable phosphate concentration, but with a higher and unsafe lead concentration.

Thus, an object of the invention is to somehow negate this see-saw between high lead concentration and high phosphate concentration, to simultaneously provide a system that provides a low lead concentration and a lowered phosphate concentration.

Referring to FIG. 1, water from a water source, a faucet or tap, is directed to and through a first matrix, and subsequently through a second matrix, and to a water outlet. It has been found that by first treating lead containing water with a mixture of a slightly soluble phosphate salt, preferably with a slightly soluble carbonate salt, followed by a second treatment to remove phosphate ions, low lead concentrations can be achieved that compare with or exceed treatment with phosphate alone.

As shown by the examples that follow, it is preferred that the first treatment be a mixture of carbonate and phosphate minerals to suppress the phosphate concentration but still achieve a suitable level of phosphate ions in the solution. Most of the lead is removed from the solution in the first matrix as a precipitate. The second treatment is required to suppress the phosphate concentration by shifting equilibrium away from the phosphate. In the embodiment illustrated in Example I, this is accomplished by shifting the equilibrium with a higher carbonate concentration by contact with slightly soluble carbonate mineral. In the embodiment in Example II, this is accomplished by contact with a very low soluble phosphate mineral that shifts the equilibrium toward precipitation of the phosphate ions.

The lead in the water reacts with the slightly soluble phosphate salts and carbonate minerals to form highly insoluble lead carbonates and phosphates. The lead phosphates in particularly are highly insoluble, and their formation is the principal reason why low concentrations below 15 ppb can be achieved. Such phosphate salts include $Pb_3(PO_4)_2$, $PbHPO_4$, $Pb_5(PO_4)_3OH$, and (in the presence of chloride) $Pb_5(PO_4)_3Cl$. The lead carbonate salt is more soluble than the lead phosphate salt, which is why through the use of carbonate minerals alone, lead concentrations cannot be reduced to satisfactorily low concentrations. The precipitation of these lead phosphate and carbonate solids and their subsequent retainment in the solid matrix is the principal pathway or the removal of lead from the drinking water.

EXAMPLE I

Tests were conducted using batch contacting of water with phosphate and carbonate salts. Batches were used for the tests because the phosphate mineral available was a very fine powder, which would require a high pressure to force water through a powder packed column or canister. Nevertheless, the chemistry obtained from batch tests is equally applicable to a continuous column or canister process. In commercial applications, it is preferred to a use crystalline minerals with large particle size, which would minimize the pressure gradient and would probably reduce the amount of phosphate remaining in the treated water.

Tests were conducted to evaluate treatment with carbonate minerals, phosphate minerals and mixtures. The tests were also conducted to evaluate treatments with a contact with a single mineral matrix material, and also to simulate treatments with a subsequent and different matrix material. For fair comparison, two consecutive tests were conducted even when only one mineral is employed. This was intended to eliminate differences due to filtration (i.e., all samples were filtered twice). In addition two additional tests were conducted in which the water samples were contacted with minerals and filtered for three cycles. The procedure of the tests was as follows;

1. Spike 2 L of tap water with 2 mg of $Pb^{2+}$. Measure pH and adjust to >5.5. The adjusted pH is $pH_0$. The spiked tap water is $S_0$.

2. Add 100 mL of $S_0$ to batch reactor (250 mL poly beaker). Record $pH_0$ for each treatment. Treatments labeled with a C are comparative examples, with an I are examples illustrating the invention.

3. Add 2 grams total of mineral salts listed in Table E1. For the treatments with two salts add 1 gram of each salt. Agitate for 10 minutes. Allow to remain static for 30 minutes. Vacuum filter through a vacuum funnel with #1 filter paper. The filtrate is $S_1$. Record the pH of $S_1$ ($pH_1$).

4. Repeat step 3. This filtrate is $S_2$. Record the pH of $S_2$. This is $pH_f$ for cases 1–7 and $pH_2$ for treatments 8 and 9.

5. For treatments 1 to 7 remove a 30 mL aliquot from $S_2$ and filter through a 0.2 μm membrane filter. Preserve with nitric acid and analyze for $Pb_T$ using an ICP/MS instrument.

6. For treatment 8 and 9 repeat step 3. This filtrate is $S_3$. Record the pH of $S_3$ ($pH_3$).

7. Repeat step 5 on $S_3$.

8. For controls perform analysis on the substrate and perform same steps as for treatments 1 to 7 but without adding any mineral salts.

9. Record data (Summarized in Table E-2).

In the Tables, treatments according to the invention are labeled with an I-prefix, and comparative treatments labeled with a C-prefix.

TABLE E-1

Mineral Salts Used for Each Treatment

| Treatment | Step 1 | Step 2 | Step 3 |
|---|---|---|---|
| C-1 | $CaCO_3$ | $CaCO_3$ | n/a |
| C-2 | $CaCO_3$ | $CaHPO_4$ | n/a |
| C-3 | $CaHPO_4$ | $CaHPO_4$ | n/a |
| C-4 | $CaHPO_4$ | $CaCO_3$ | n/a |
| C-5 | $CaCO_3$ | $CaCO_3 + CaHPO_4$ | n/a |
| I-6 | $CaCO_3 + CaHPO_4$ | $CaCO_3$ | n/a |
| C-7 | $CaCO_3 + CaHPO_4$ | $CaCO_3 + CaHPO_4$ | n/a |
| I-8 | $CaCO_3$ | $CaHPO_4$ | $CaCO_3$ |
| I-9 | $CaCO_3$ | $CaCO_3 + CaHPO_4$ | $CaCO_3$ |

TABLE E-2

Data from each Treatment

| Treatment | $pH_0$ | $pH_1$ | $pH_2$ | $pH_f$ | $PO_4^{3-}$ (mg/L) | $Pb_T$ (μg/L) |
|---|---|---|---|---|---|---|
| C-1 | 5.8 | 7.3 | n/a | 7.3 | — | 74 |
| C-2 | 5.9 | 7.3 | n/a | 7.4 | 74 | 68 |
| C-3 | 5.9 | 7.3 | n/a | 7.1 | 101 | 10 |
| C-4 | 5.9 | 7.2 | n/a | 7.2 | 88 | <15 |
| C-5 | 5.9 | 7.3 | n/a | 7.2 | 77 | 96 |
| I-6 | 5.9 | 7.2 | n/a | 7.3 | 57 | 9 |
| C-7 | 5.9 | 7.2 | n/a | 7.3 | 88 | 4 |
| I-8 | 5.9 | 7.3 | 7.6 | 7.6 | 60 | 4 |
| I-9 | 5.9 | 7.3 | 7.7 | 7.7 | 70 | 4 |
| Blank | 5.9 | 5.9 | n/a | 5.6 | — | 1540 |
| Substrate | 5.9 | n/a | n/a | n/a | — | 1690 |

Referring to Tables E-1 and E-2, in C-1, C-2, and C-5, there was no phosphate in the initial treatment that resulted in an unsatisfactory removal of lead. This was the case even when there was a subsequent treatment with a phosphate mineral, or a mixed phosphate/carbonate mineral (C-2, C-5). Treatment with the phosphate mineral alone (C-3) provided a low lead concentration, but the phosphate concentration was too high (101 mg/L) for palatable water. Treatment solely with a mixed mineral (C-7) provides similar results, i.e., the lead concentration is low, but the phosphate concentration is still too high (88 mg/L).

The preferred practice of the invention is shown in treatment I-6. Here the water was first treated with a mixed mineral matrix, followed by a treatment with a carbonate mineral matrix. The results show a low lead concentration, with a phosphate concentration (57 mg/L) significantly below the comparative examples with phosphate salts.

Treatment C-4 illustrates the difficulty in reducing the phosphate concentration when the first matrix contains solely a phosphate mineral or a high proportion thereof, and the utility of using a mixture with a carbonate mineral to reduce the phosphate ion concentration. In addition, the carbonate mineral used was coarser and would help water flow through the matrix. The lead concentration was satisfactorily reduced, but because of the high phosphate concentration after the first treatment, the second treatment, although reducing the phosphate concentration, did not reduce the same to a desirable value below 60 mg/L. However, by design of the second matrix, e.g., to increase the contact time, or by using an insoluble mineral in the second matrix, as in Example II, it is possible to obtain desirably low phosphate concentrations in instances where the first matrix is mostly phosphate mineral.

Treatments I-8 and I-9 illustrate less preferred embodiments of the invention, since they both require an additional third treatment. Treatment I-8 achieved a similar equilibrium of carbonate, phosphate, and lead ions to that achieved with a mixed salt, but two successive treatments, a with carbonate and then with a phosphate salt. Treatment I-9 is essentially the same as I-6 with an additional pretreatment with a carbonate salt. The lead concentration improved only slightly, suggesting two different treatments as in I-6 is probably sufficient for a commercial device.

EXAMPLE II

An apparatus of the invention is constructed with a first mineral bed and a second mineral bed. Tests are run with the first mineral bed comprising a mixture of $CaHPO_4 \cdot 2H_2O(s)$ (brushite) and $CaCO_3(s)$ with amounts of $CaHPO_4(s)$ of 10, 20, 30, 40, 50, 60, 70, 80, 90, 95, 100 wt. %. A comparative test are also run with a $CaHPO_4(s)$ amount of 5 wt. % for comparison. The second mineral bed is $Ca_5(PO_4)_3OH(s)$ (hydroxyapatite solid).

The process can be explained as follows;
1. The first mixture of the first matrix is to produce phosphate ions at a sufficient level, but this release of phosphate is controlled at a modest level by the common calcium ion contributing from the carbonate mineral.
2. The phosphate ions (about 100 mg/L) form with lead ions a precipitate that will be filtered and retained in the first and possibly part of the second matrix as the water migrates through.
3. The treated water, now depleted of lead by enriched with calcium and phosphate ions, can be polished by contacting with the hydroxyapatite mineral. This mineral is extremely insoluble, allowing only trace about (<100 mg/L) of phosphate when in full equilibrium:

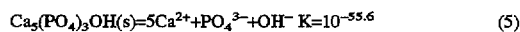

$$Ca_5(PO_4)_3OH(s) = 5Ca^{2+} + PO_4^{3-} + OH^- \quad K=10^{-55.6} \quad (5)$$

as compared to brushite in the first matrix:

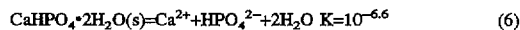

$$CaHPO_4 \cdot 2H_2O(s) = Ca^{2+} + HPO_4^{2-} + 2H_2O \quad K=10^{-6.6} \quad (6)$$

This means calcium and phosphate ions in the second matrix will react to precipitate as a hydroxyapatite solid as indicated by the reverse reaction of Equation (5). At pH 7.5, this will result in low residual amounts of calcium and phosphates, which are expected to be negligible (<<1 mg/L) if full equilibrium is attained in the second matrix.

In general, it can be seen by practice of the invention that the lead concentrations can by reduced to a safe concentration with a suitably low concentration of phosphate ions. In addition, the pH of the solution was raised but was still in a region suitable for drinking water.

While this invention has been described with reference to certain specific embodiments and examples, it will be recognized by those skilled in the art that many variations are possible without departing from the scope and spirit of this invention, and that the invention, as described by the claims, is intended to cover all changes and modifications of the invention which do not depart from the spirit of the invention.

What is claimed is:
1. A process for removing lead from drinking water discharged from a drinking water outlet comprising:
   (a) directing the water through a first matrix comprising a mineral of between 10 and 100 weight percent of a solid phosphate mineral which is slightly soluble in water, the remaining portion being a solid carbonate mineral which is slightly soluble in water, such that there is sufficient contacting between the water and the first matrix to introduce sufficient phosphate ions into the water to form lead precipitate and reduce the lead concentration in the water to below 15 parts per billion, the phosphate mineral and the carbonate mineral containing the same element as a cation, (b) directing the lead depleted water from step (a) through a second matrix, the second matrix comprising a mineral that when in equilibrium with the water reduces the phosphate ion concentration to 60 mg/L or below.

2. The process of claim 1 wherein the mineral in step (b) is a solid carbonate mineral that contains the same element as a cation as the first matrix and the mineral is slightly soluble in water so as to introduce sufficient carbonate ion into solution to reduce the phosphate ion concentration to about 60 mg/L or below.

3. The process of claim 1 wherein the element of the cation is chosen from the group consisting of calcium and magnesium.

4. The process of claim 3 wherein the element of cation is calcium.

5. A process for removing lead from drinking water discharged from a drinking water outlet comprising:

(a) directing the water through a first matrix comprising a calcium mineral of between 10 and 100 weight percent of a solid calcium phosphate mineral which is slightly soluble in water, the remaining portion being a solid calcium carbonate mineral which is slightly soluble in water, such that there is sufficient contacting between the water and the first matrix to introduce sufficient phosphate ions into the water to form lead precipitate and reduce the lead concentration in the water to below 15 parts per billion, (b) directing the lead depleted water from step (a) through a second matrix, the second matrix comprising a solid carbonate mineral that is slightly soluble in water so as to introduce sufficient carbonate ion into solution to reduce the phosphate ion concentration to about 60 mg/L or below.

6. The process of claim 5 wherein the first matrix comprises 10 to 50 weight percent calcium phosphate, the remaining portion being the calcium carbonate mineral.

7. A process for removing lead from drinking water discharged from a drinking water outlet comprising:

(a) directing the water through a first matrix comprising a calcium mineral of between 10 and 100 weight percent of a solid calcium phosphate mineral which is slightly soluble in water, the remaining portion being a solid calcium carbonate mineral which is slightly soluble in water, such that there is sufficient contacting between the water and the first matrix to introduce sufficient phosphate ions into the water to form lead precipitate and reduce the lead concentration in the water to below 15 parts per billion, (b) directing the lead depleted water from step (a) through a second matrix, the second matrix comprising an insoluble phosphate mineral that when in equilibrium with the water the concentration of the phosphate ion in the solution is less than 60 mg/L.

8. An apparatus of the point-of-use removal of lead from drinking water comprising;

(a) a first matrix comprising a calcium mineral of between 10 and 100 weight percent of a solid calcium phosphate mineral which is slightly soluble in water, the remaining portion being a solid calcium carbonate mineral which is slightly soluble in water, (b) a second matrix, the second matrix comprising a second matrix mineral that in equilibrium with water provides a phosphate ion concentration of less than 60 mg/L, and (c) conduits for directing water from a culinary water source through the first matrix, then subsequently through the second matrix, and then to an outlet, such that the water flow first through the first matrix and the second matrix with sufficient contacting between the water and the first matrix to introduce sufficient phosphate ions into the water to form lead precipitate and reduce the lead concentration in the water to below 15 parts per billion, and sufficient contact with the second matrix such that the phosphate ion concentration is reduced to 60 mg/L or below.

* * * * *